(12) United States Patent
Matsumoto

(10) Patent No.: US 6,920,362 B2
(45) Date of Patent: Jul. 19, 2005

(54) CONTROL APPARATUS

(75) Inventor: Toshio Matsumoto, Munakata (JP)

(73) Assignee: President of Saga University, Saga (JP)

( * ) Notice: Subject to any disclaimer, the term of this patent is extended or adjusted under 35 U.S.C. 154(b) by 731 days.

(21) Appl. No.: 09/879,158

(22) Filed: Jun. 13, 2001

(65) Prior Publication Data

US 2001/0053941 A1 Dec. 20, 2001

(30) Foreign Application Priority Data

Jun. 14, 2000 (JP) ........................................ 2000-178535

(51) Int. Cl.[7] .............................................. G05B 13/02
(52) U.S. Cl. ............................. 700/45; 700/28; 700/37; 700/44
(58) Field of Search .............................. 700/28, 37, 40, 700/42–45, 54–55; 318/561

(56) References Cited

U.S. PATENT DOCUMENTS

| | | | | |
|---|---|---|---|---|
| 4,346,433 A | * | 8/1982 | Rutledge | .................... 700/42 |
| 4,466,054 A | * | 8/1984 | Shigemasa et al. | ........... 700/42 |
| 5,019,958 A | * | 5/1991 | Varga et al. | ................... 363/97 |
| 5,034,872 A | * | 7/1991 | Losic et al. | .............. 363/21.01 |
| 5,200,681 A | * | 4/1993 | Hiroi | .......................... 318/610 |
| 5,282,129 A | * | 1/1994 | Losic et al. | .................... 700/32 |

* cited by examiner

Primary Examiner—Anthony Knight
Assistant Examiner—Ronald D Hartman, Jr.
(74) Attorney, Agent, or Firm—Oblon, Spivak, McClelland, Maier & Neustadt, P.C.

(57) ABSTRACT

A control apparatus which controls a controlled system with a transfer function regarded as a secondary delay, comprises an outer loop which performs negative feedback of an output of the controlled system in order to obtain a deviation between the output and a desired value, an inner loop which performs negative feedback of a signal obtained by multiplying a differential value of the output of the controlled system by a first gain to the deviation, and a nonlinear inner feedback loop which uses the differential value of the output of the controlled system and a product obtained by multiplying an absolute value of the deviation $e$ or n-th (n is an integer) power of the absolute value by the second gain to perform positive feedback to the deviation.

14 Claims, 4 Drawing Sheets

Settling time to k1 and k2 in the range of $\zeta > 1$ (set point: 6000rpm)

| $k_1 (\times 10^{-3})$ | $k_2 (\times 10^{-3})$ | Settling time [ms] |
|---|---|---|
| 20 | 0.4 | 0.5 |
| 40 | 0.8 | 0.3 |
| 60 | 1.3 | 0.2 |
| 80 | 1.7 | 0.2 |
| 100 | 2.1 | 0.1 |

CONTROL APPARATUS

CROSS-REFERENCE TO RELATED APPLICATIONS

This application is based upon and claims the benefit of priority from the prior Japanese Patent Application No. 2000-178535, filed Jun. 14, 2000, the entire contents of which are incorporated herein by reference.

BACKGROUND OF THE INVENTION

1. Field of the Invention

The present invention relates to a control apparatus applied to a speed control or a position control in an industrial robot, a numerical control (NC) machine, a head track seeking of a disk drive or the like.

2. Description of the Related Art

In general, a servo mechanism using a servo actuator has been widely utilized in a position-to-position high speed positioning control or a high speed tracking control for an industrial robot, a NC machine and the like, and a head track seeking or the like for a hard disk drive or a floppy disk drive used in a data processing unit. In the servo mechanism, a high speed response is one of very important conditions for such a control as a speed control, a positioning control or the like.

Now, in a control apparatus which controls an object including a servo mechanism having various transfer functions of secondary delay, it has been known that the settling time becomes a minimum time, when a critical damping wherein a damping coefficient of a control system constructing a control apparatus becomes 1 is made under a condition that an overshoot does not occur. That is, in a conventional control system constructed by an inner loop for a negative feedback of an output and another inner loop for negative-feeding back the product of the differential value of the output and a gain, the settling time may be set to be minimum by setting the gain in the another inner value in a proper value. Namely, the response of the control system of the conventional control apparatus is expressed by the following differential equation (1).

$$(d^2x/dt^2) + \{(J+k1)/JT\} \cdot (dx/dt) + (1/JT) \cdot x = (1/JT)r \quad (1)$$

where J is a constant, T is a time constant, and k1 is a gain.

Therefore, the gain k1 can be set such that the damping coefficient $\xi = J + k1/2\sqrt{JT} = 1$ is obtained. However, when the damping coefficient $\xi$ exceeds 1, the response becomes slower, so that the settling time is prolonged. Also, when the damping coefficient $\xi$ becomes less than 1, the response becomes faster but vibrating even when an overshoot is allowed, so that much improvement can not be obtained.

Accordingly, in a field that the settling time is set to be shorter than that at the time of the critical damping and the high speed response is required, a new control approach is required. In a case that such a control system is constituted on the basis of the following equation (2), $$(d^2e/dt^2) + \{(2\xi Wn)/(1+|e|)\} \cdot (de/dt) + Wn^2 e = 0 \quad (2)$$

where Wn is natural frequency and $e$ is deviation, and it is considered that, when the deviation between the input value and the output value is large, a control is conducted so as to approach to a steady state by reducing an apparent damping coefficient $\xi' = \xi/(1+|e|)$ to make the response fast but, when the deviation $e$ becomes small, a control is conducted so as to suppress an overshoot by increasing the apparent damping coefficient. However, according to this approach, there is a problem that, since the response is expressed by a nonlinear differential equation, when the deviation becomes large even in a case of $\xi=1$ in the equation (2), an overshoot occurs.

An object of the present invention is to provide a control apparatus which reduces the settling time largely without occurrence of an overshoot and which achieves a high speed response.

BRIEF SUMMARY OF THE INVENTION

According to an aspect of the invention, there is provided a control apparatus which controls a controlled system with a transfer function regarded as a secondary delay system. The control apparatus comprises an outer loop for a negative feedback of an output $\underline{x}$ of the controlled system in order to obtain an error $\underline{e}$ between the output $\underline{x}$ and a desired value $\underline{r}$; a first inner loop for a negative feedback of a signal $k1 \cdot (dx/dt)$ obtained by multiplying a differential value $(dx/dt)$ of the output $\underline{x}$ of the controlled system by a gain k1 to the deviation $\underline{e}$; and a second inner loop for a positive feedback of a signal of $k2(dx/dt) \cdot |e|$ or $k2(dx/dt) \cdot |e|^n$ to the error $\underline{e}$, using the differential value $(dx/dt)$ and the product obtained by multiplying an absolute value $|e|$ of the deviation $\underline{e}$ or n-th power (n: integer) of the absolute value $|e|$ by a gain k2.

According to the above configuration based on an aspect of the present invention, if the gains k1 and k2 are set so as to meet a predetermined conditional expression of damping coefficients of a control system which are zero and positive, the settling time can be reduced largely and a high speed response can be achieved without occurrence of an overshoot even in a control system having a controlled system with a transfer function regarded as an secondary delay.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Embodiments of the present invention will be explained below with reference to the drawings.

Figure 1:
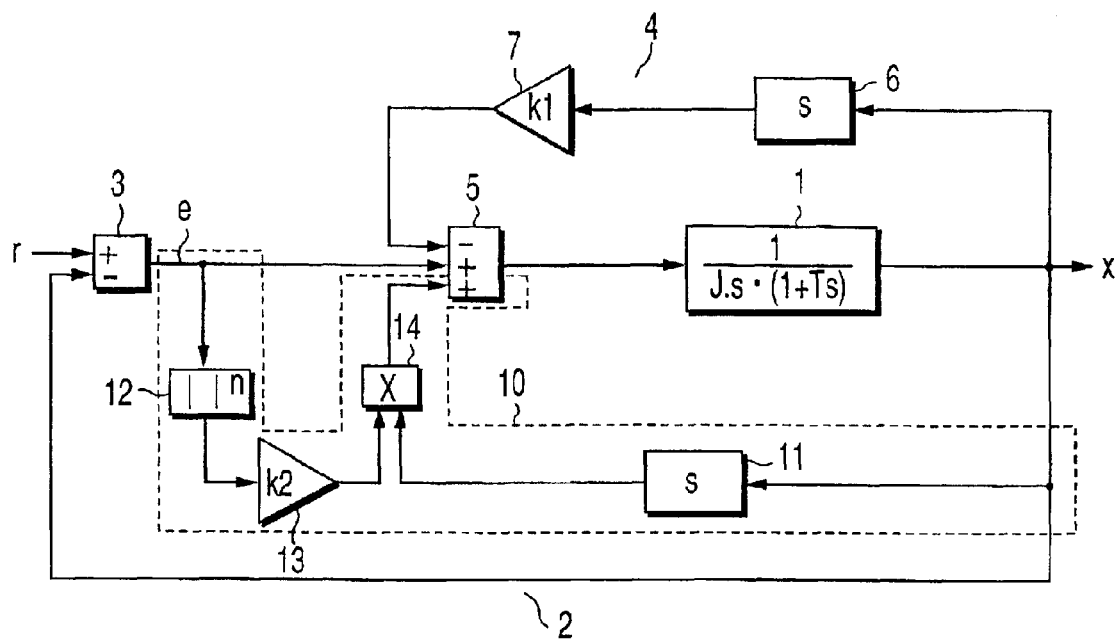
FIG. 1 is a block diagram of a control apparatus according to an embodiment of the present invention.

FIG. 1 shows a control apparatus according to the embodiment of the present invention and applied to a speed control system having the controlled system regarded as a second order system. In, for example, a servo mechanism using a servo actuator, a speed control system having an inertia moment or a mass wherein a torque or a thrust generator is approximated with the first order lag element, a position control system wherein a speed controller is approximated with the first order element, or the like is exemplified as a controlled system regarded as the second order system.

This control apparatus comprises a multi-closed loop control system. In other words, the control apparatus comprises an outer loop 2, an inner loop 4 and a nonlinear inner feedback loop 10. The outer loop 2 executes a negative feedback of an output from a controlled system 1, and includes a deviation computing unit 3 which computes the deviation between a desired value $r$ and a controlled variable, namely the output $x$ which is the signal of the outer loop 2. The inner loop 4 executes a negative feedback of the product between a differential value of the controlled variable, namely the speed $x$ and a gain k1, that is, a compensation signal to a transient change.

A compensation unit 5 performs such a processing that the deviation from the deviation computing unit 3 is cancelled by the compensation signal from the inner loop 4, and a nonlinear inner feedback loop 10.

The inner loop 4 comprises a computing unit 6 having a laplace operator $s$ which takes out the differentiated output of the controlled variable or the output $x$ of the controlled system 1 and a gain multiplier 7 which multiplies a proper gain k1 to the differentiated output from the computing unit 6 for a feedback. The inner loop 4 generates the compensation signal for the transient change of the controlled variable or the output $x$. Incidentally, J in the transfer function of the controlled system 1 is an inertial moment, T is a time constant, and s is a laplace operator unit.

Such a control apparatus can control the output of the controlled system 1 to a transient change by setting the gain k1 multiplied to the differentiation of the controlled variable, namely output $x$ of the controlled system 1 properly using the inner loop 4 to conduct compensation through a feedback.

The nonlinear inner feedback loop 10 forms an inner positive feedback loop comprising a laplace operator unit 11, an absolute computing unit 12, a gain computing unit 13, and a positive feedback unit 14. The laplace operator unit 11 outputs the differential value of the controlled variable, namely speed $x$ of the controlled system 1, The absolute computing unit 12 computes the absolute value of the deviation $e(r-x)$ obtained by the deviation computing unit 3 or n-th (n=1, 2, 3, ...) power of the absolute value. The gain computing unit 13 multiplies the computation output of the computing unit 12 by a gain k2. The positive feedback unit 14 executes the positive feedback of the product of the output of the gain computing unit 13 and the differential value of the controlled variable or speed x to the compensation unit 5. The nonlinear inner feedback loop 10 serves so as to change the damping coefficient $\xi$ of the control system according to the deviation $e$ from the deviation computing unit 3.

Meanwhile, the inner loop 4 performs the negative feedback of the product of the speed differentiation and the gain and it plays a roll for determining a damping coefficient at a time of a steady state. Therefore, the response of the control system shown in FIG. 1 is expressed by the following differential equation (3).

$$(d^2x/dt^2)+\{(J+k1-k2|r-x|^n)/JT\}\cdot(dx/dt)+(1+JT)\cdot x=(1/JT)r \quad (3)$$

The damping coefficient is represented in the following equation (4).

$$\xi^*=[(J+k1-k2|r-x|^n)/2(JT)^{1/2}] \quad (4)$$

Now, $\xi^* \geq 0$ is assumed from the equation (4) regardless of the controlled variable, namely speed $x$ of the controlled system 1. That is, when the desired value $r$, and the gains k1 and k2 are determined under such conditions that $J+k1-k2\cdot|r|^n \geq 0$ is met in the equation (4), the settling time can be reduced without any overshoot.

Figure 2:
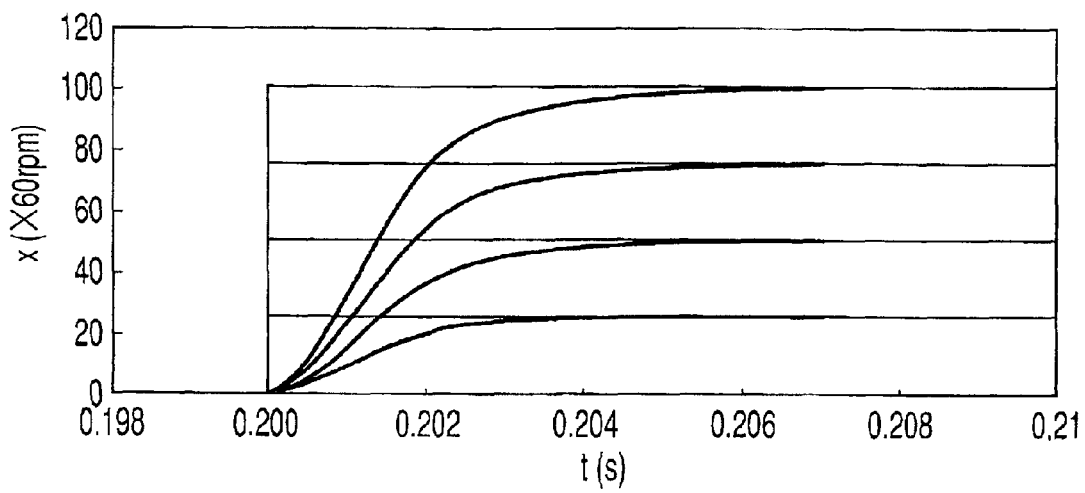
FIG. 2 is a graph showing the step response of the control system of n=1 in speed control of an AC servo motor of 500W.
Figures 3, 4:
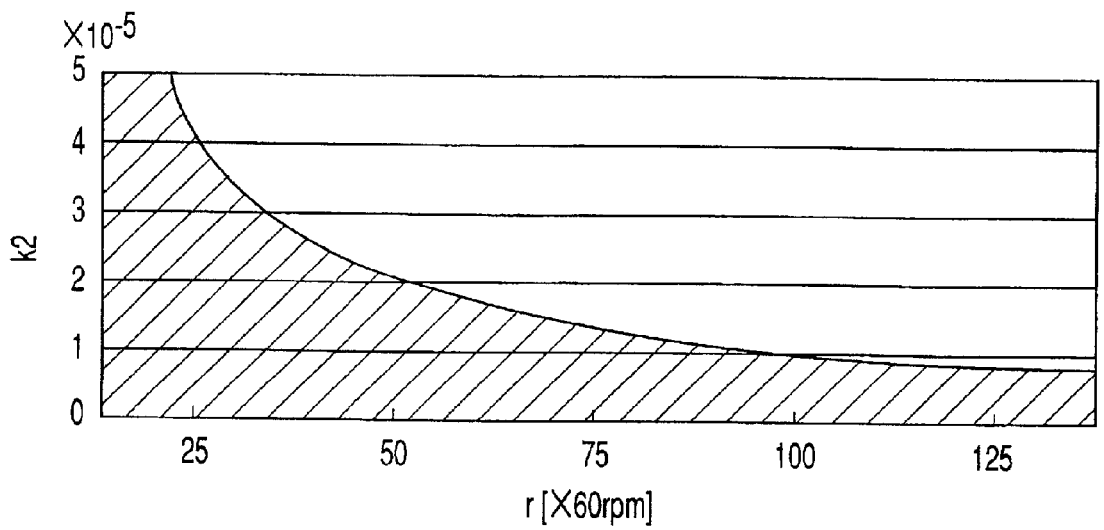
FIG. 3 is a graph showing the relationship between a desired value $\underline{r}$ and a gain k2 under the same conditions as those in FIG. 2.
FIG. 4 is a graph showing the relationship among the gains k1, k2 and a settling time at a time of the set point $\underline{r}$=6000 rpm.

FIG. 2 shows a step response of the speed control system using an AC servo motor of 500 W (J=0.1×10$^{-3}$ kgm$^2$, T=10 ms) and n=1. Particularly, FIG. 2 shows the step response obtained when k1 is set to be $\xi^*=1$ in a steady state, and for the desired set value $r$ the gain k2 falling in a range in which any overshoot does not occur are set. FIG. 3 shows the relationship between the step desired value $r$ and the gain k2.

Also, for example, in a case of J+k1=c, when the condition of $c-k2|r| \geq 0$ is met according to $\xi^* \geq 0$ shown with the equation (4), a step response having a settling time shorter than that in a conventional second order control system can be obtained without any overshoot. In FIG. 3, the section which is defined below a solid line is an area wherein any overshoot does not occur. Incidentally, it has been confirmed that, in a case of the gain coefficient k2=c/|r|, improvement in settling time can be maximized.

Regarding a rated set point (3000 rpm), when the present speed control system is set to k2=3×20$^{31\ 5}$ and the damping coefficient $\xi=\xi^*=1$ in the steady state by changing the damping coefficients, the present speed control system can be improved 70% in the settling time in comparison with the conventional speed control system of the damping coefficient $\xi=1$.

Furthermore, when the gain k1 is set so as to meet the damping coefficient $\xi=\xi^* \geq 1$ in the steady state and the gain k2 is set so as to meet the condition of $J+k1-k2|r| \geq 0$, the control system with the condition thus set can further reduce the settling time when compared with the control system of the damping coefficient $\xi=\xi^*=1$.

Figure 5:
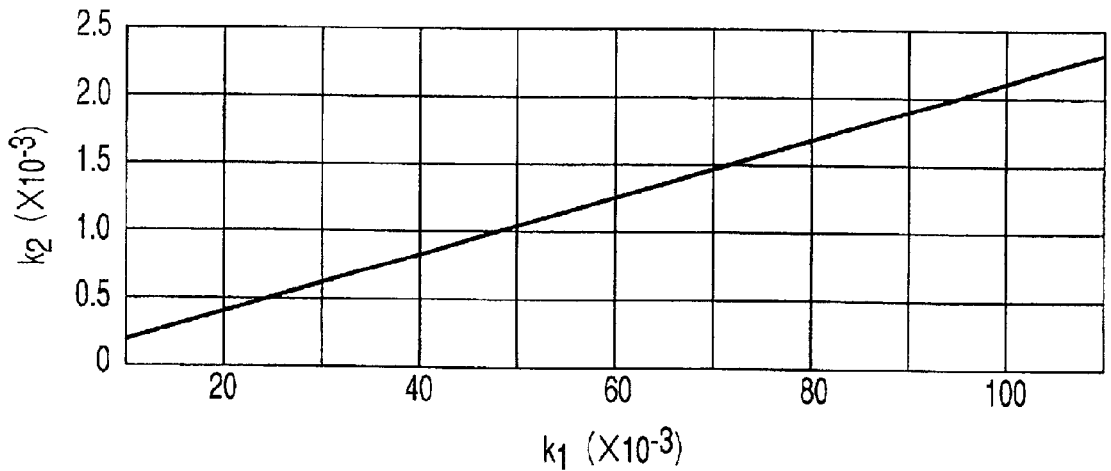
FIG. 5 is a graph showing the relationship between the gains k1 and k2 for performing the setting without overshooting.

Also, when the desired value $r$=6000 rpm is set, the gains k1, k2 and the settling time have the relationship shown in FIG. 4 and the relationship is graphically represented as shown in FIG. 5. From these figures, the relationship among the desired value $r$, and the gains k1 and k2 meets $J+k1-k2\cdot|r| \approx 0$. Accordingly, this control system achieves the settling time of $\frac{1}{10}$ or less so that its settling time can further be reduced as compared with the conventional control system of the damping coefficient $\xi=1$.

Next, in a control system where n=2 is set in the nonlinear inner feedback loop 10, the damping coefficient is expressed by the following equation (5).

$$\xi^*=\{(J+k1-k2|r-x|^2)\}/2(JT)^{1/2} \quad (5)$$

Figure 6:
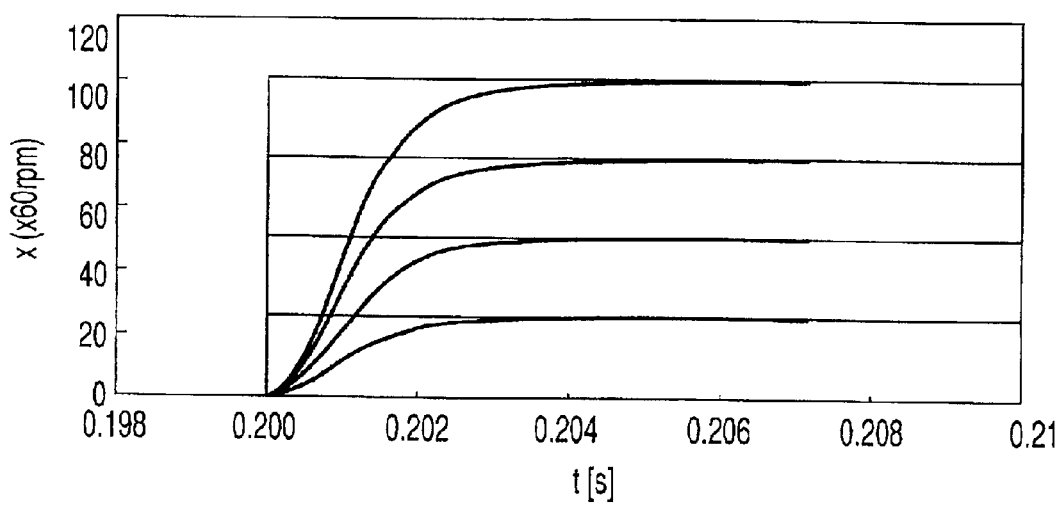
FIG. 6 is a graph showing a step response of the control system of n=2 in speed control of an AC servo motor of 500W.

When the desired value r, and the gains k1 and k2 are set so as to meet the condition of $J+k1-k2 \cdot r^2 \geq 0$, the response can be improved without overshoot and the settling time can be made smaller than that of the control system of n=1. FIG. 6 shows a step response obtained when r=3000 rpm and $k1=1.9 \times 10^{-3}$ are set and the gain k2 is changed. The settling time of this control system is improved as compared with the control system of n=1 and the degree of the improvement can achieve about 50%.

Figure 7:
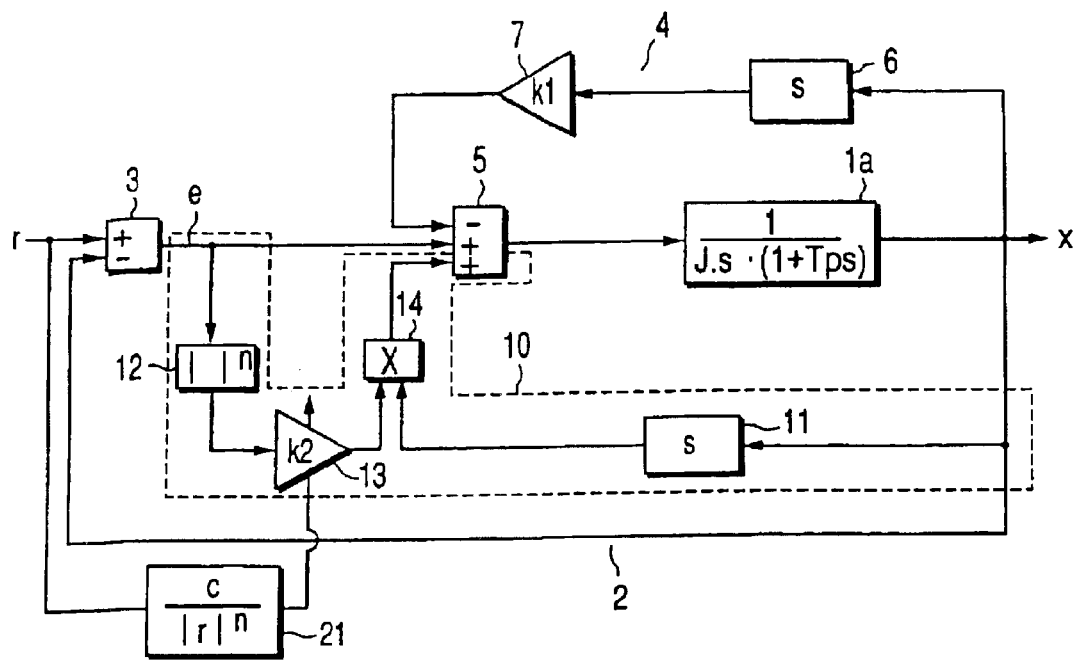
FIG. 7 is a block diagram of the control apparatus according to another embodiment of the present invention.

FIG. 7 shows a control apparatus according to another embodiment of the present invention.

This embodiment is a control apparatus for a position control system wherein the controlled system 1 is replaced with the controlled system 1a of a position control model of 1/Js(1+TpS) and an adjusting element 21 which sets the gain k2 to $K2=c/|r|^n(c=J+k1)$ under the desired value r is provided. As the other elements or configuration parts in this embodiment are similar to those in FIG. 1, like parts are denoted by like reference numerals in FIG. 1 and detailed explanation thereof will be omitted.

Since this control apparatus comprises to be similar to that in FIG. 1, the relationship equation of the desired value r, and the gains k1 and k2 results in $c-k2 |r|^n=J+k1-k2 |r|^n \geq 0$, so that overshoot is prevented from occurring and the settling time can be reduced like the case in FIG. 1.

Figure 8:
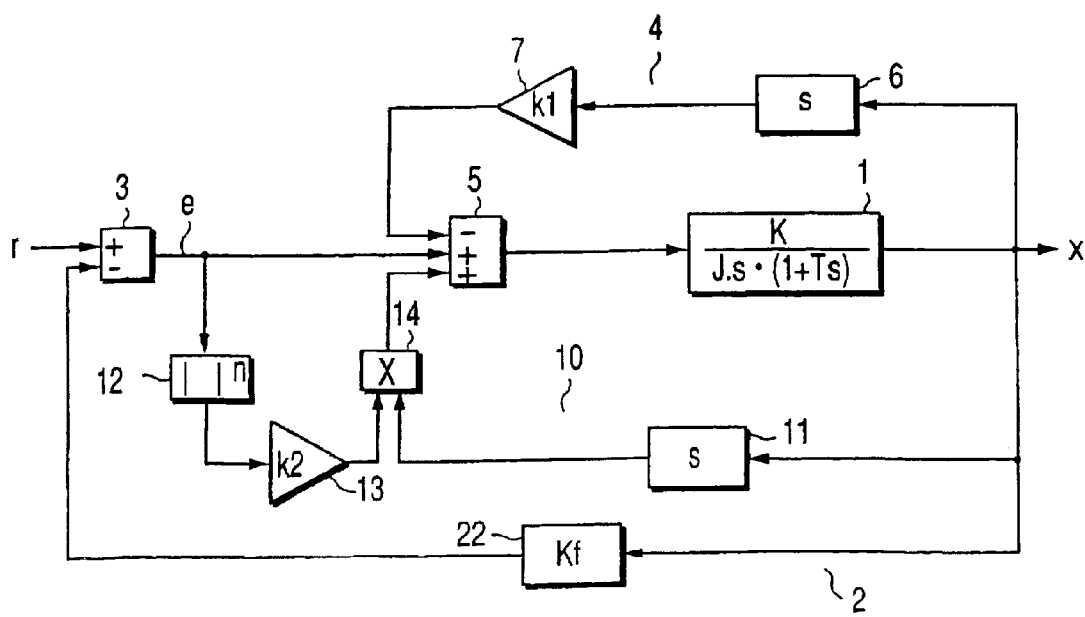
FIG. 8 is a block diagram of the control apparatus according to another embodiment of the present invention.

FIG. 8 shows a control apparatus according to still another embodiment of the present invention. This control apparatus is provided with a control system where a gain K is applied to the controlled system 1, and a gain multiplier 22 having a loop gain kf is added to the outer loop 2 which feeds back the controlled variable, namely speed x from the controlled system 1. As the other elements or configuration parts in this embodiment are similar to those in FIG. 1, like parts are denoted by like reference numerals in FIG. 1 and detailed explanation thereof will be omitted.

The differential equation showing the response of this control system results in the following equation (6).

$$(dx^2/dt^2)+\{(J+k1-K \cdot k2|r-Kf|^n)/JT\} \cdot (dx/dt)+(K \cdot Kf/JT)x=(K/JT)r(n=1, 2, 3, \ldots) \quad (6)$$

Also, the damping coefficient $\xi^*$ of the control system results in $\xi^*=(J+k1-Kk2|r-K \cdot fx|^n)/2(JT)^{1/2}$. Therefore, when the gains K, k1 and k2 and the desired value r are set so as to meet $J+k1-K \cdot k2 |r|^n \geq 0$, the settling time can be reduced. Here, in the section where $J+k1-K \cdot k2 |r|^n \geq 0$ is met, the gain k1 is make large, and the gains k1, k2 and K are set with respect to the desired value r such that a value approaches to $J+k1-K \cdot k2 |r|^n=0$ as much as possible, so that the settling time is reduced without overshoot, thereby allowing a high speed response.

Thus, according to the above embodiments, by adding a nonlinear inner positive feedback loop to a control system on the basis of the conventional control system, gains and the like are set such that the damping coefficient of the control system meets a positive relationship regardless of the controlled variable, the speed output or the like of the controlled system 1, so that the settling time can largely be reduced without overshoot and a high speed response can be attained.

As set forth above, according to the present invention, a settling time can largely be reduced without overshoot and a high speed response can be realized.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A control apparatus for controlling a control system having a transfer function regarded as a second order system, comprising:

an outer loop configured to execute a negative-feedback of an output scalar x of the controlled system to obtain a deviation scalar e between the output scalar x and a desired value scalar r;

a first inner loop configured to execute a negative-feedback of a signal k1(dx/dt), obtained by multiplying a gain k1 to a differentiated value (dx/dt) of the output scalar x of the controlled system, to the deviation scalar e; and a second inner loop configured to use the differentiated value (dx/dt) of the output x of the controlled system and a product, obtained by multiplying a gain k2 to an absolute value |e| of the deviation scalar e or n powers (n=1,2,3, . . . ) of the absolute value |e|, to execute the positive feedback of a signal of $k2(dx/dt) \cdot |e|$ or $k2(dx/dt) \cdot |e|^n$ to the deviation scalar e, wherein the controlled system is controlled using a signal which is fed back through the first and the second inner loops.

2. A control apparatus according to claim 1, wherein, when the controlled system includes a position control model, an adjusting element which changes the gain k2 to $c/|r|$ or $c/|r|^n$ based on the desired value scalar r is provided.

3. A control apparatus according to claim 1, wherein a loop gain is inserted in the outer loop, when the controlled system has a transfer function with a proportional gain.

4. A control apparatus according to claim 1, wherein the gains k1 and k2 are set to values meeting the following equation of damping coefficients of a control system which are zero and positive: $J+k1-k2 |r| \geq 0$ or $J+k1-k2 |r|^n \geq 0$, where J is a constant determined due to the controlled system with a secondary delay.

5. A control apparatus according to claim 4, wherein, when the controlled system is a position control model, an adjusting element which changes the gain k2 to $c/|r|$ or $c/|r|^n$ based on the desired value scalar r is provided.

6. A control apparatus according to claim 4, wherein, when the controlled system has a transfer function including a proportional gain, a loop gain is inserted in the outer loop.

7. A control apparatus comprising:

an outer feedback loop which performs negative feedback of an output from a controlled system;

a deviation computing unit which computes a deviation between a desired value and a controlled variable or output of the outer feedback loop;

a first inner feedback loop which performs negative feedback of a product of a differential value of the controlled variable or speed and a gain;

a compensation unit which performs processing for canceling the deviation from the deviation computing unit by a compensation signal from the first inner feedback loop; and a second inner feedback loop which changes a damping coefficient of a control system according to the deviation from the deviation computing unit.

8. A control apparatus according to claim 7, wherein the controlled system includes a gain K, and the outer feedback loop includes a gain computing element which multiplies the output of the controlled system by a loop gain Kf to perform feedback of the product.

9. A control apparatus according to claim 7, wherein the second inner feedback loop comprises a laplace operator which outputs a differential value of a controlled variable or speed of the controlled system, an absolute value computing element which computes an absolute value of the deviation obtained from the deviation computing element or n-th (n=1, 2, 3, . . . ) power of the absolute value, a gain computing element which multiplies the computation output of the absolute value computing element with another gain, and a positive feedback element which performs positive feedback of a product of the output of the gain computing element and a differential value of the controlled variable or speed to the compensation element.

10. A control apparatus according to claim 9, wherein the controlled system includes a gain K, and the outer feedback loop includes a gain computing element which multiplies the output of the controlled system by a loop gain Kf to perform feedback of the product.

11. A control apparatus according to claim 7, wherein the first inner feedback loop comprises a computing element having a laplace operator which takes out a differential output of the controlled variable or output of the controlled system, and a gain computing element which multiplies the differential output from the computing element by the gain to obtain the product.

12. A control apparatus according to claim 11, wherein the controlled system includes a gain K, and the outer feedback loop includes a gain computing element which multiplies the output of the controlled system by a loop gain Kf to perform feedback of the product.

13. A control apparatus according to claim 11, wherein the second inner feedback loop comprises a laplace operator which outputs a differential value of a controlled variable or speed of the controlled system, an absolute value computing element which computes an absolute value of the deviation obtained from the deviation computing element or n-th (n=1, 2, 3, . . . ) power of the absolute value, a gain computing element which multiplies the computation output of the absolute value computing element with another gain, and a positive feedback element which performs positive feedback of a product of the output of the gain computing element and a differential value of the controlled variable or speed to the compensation element.

14. A control apparatus according to claim 13, wherein the controlled system includes a gain K, and the outer feedback loop includes a gain computing element which multiplies the output of the controlled system by a loop gain Kf to perform feedback of the product.

* * * * *